United States Patent [19]

Ishii et al.

[11] 4,157,779

[45] Jun. 12, 1979

[54] PROCESS FOR PRODUCING A METAL VACUUM BOTTLE

[75] Inventors: Hiroshi Ishii, Tokyo; Masahiko Arashi, Chiba; Saburo Ishijima, Yokohama; Kenichi Miyaji, Chiba; Yasuhiko Satomi, Yokohama, all of Japan

[73] Assignee: Nippon Sanso K.K., Japan

[21] Appl. No.: 892,113

[22] Filed: Mar. 31, 1978

[30] Foreign Application Priority Data

Oct. 20, 1977 [JP] Japan .............................. 52-126225

[51] Int. Cl.² .............................................. B23K 1/12
[52] U.S. Cl. .................................. 228/176; 228/184; 29/455 R; 215/12 R
[58] Field of Search ....................... 228/176, 184, 217; 29/455 R; 215/12 R, 13 R; 113/120 R, 120 P

[56] References Cited

U.S. PATENT DOCUMENTS

| 2,024,065 | 12/1935 | Schellens ......................... 228/184 X |
| 3,457,630 | 7/1969 | Schwartz et al. ................ 228/217 X |

Primary Examiner—Milton S. Mehr
Attorney, Agent, or Firm—Kane, Dalsimer, Kane, Sullivan and Kurucz

[57] ABSTRACT

A process for producing a metal vacuum bottle composed of internal and external shells made of metal, said process comprising the steps of brazing the seamed portion formed between said two shells through a vacuum heating treatment for an assembly of the vacuum bottle accommodating a getter to be sealed therewithin, and of enhancing the vacuum degree between said shell by maintaining the temperature of activating the getter for a certain period of time.

6 Claims, 3 Drawing Figures

PROCESS FOR PRODUCING A METAL VACUUM BOTTLE

BACKGROUND OF THE INVENTION

The present invention relates to a process for producing a metal vacuum bottle by a vacuum brazing operation, and in particular to a process which provides a metal vacuum bottle having an enhanced degree of vacuum within a thermal insulation layer portion thereof.

In general, a metal vacuum bottle has been produced in such a manner that after the internal and the external shells having been seamed together at their top openings, an evacuation of a jacket between said two shells is carried out through the vacuum suction port which is beforehand provided on the bottom part of the external shell. However, the vacuum thermal insulation effect is often difficult to maintain for a long period of time because of leakage from the inner peripheral surface of the external shell and the outer peripheral surface of the internal shell or other parts. In order to maintain the desired thermal insulation effect, it is necessary to maintain the high degree of vacuum by repeating a proper evacuating process, but such operation for repeating evacuation as set forth above is very complicated as well as possibly deteriorating the value of merchandise.

From the aforesaid shortcomings, a process for producing a metal vacuum bottle of the type mentioned above by a vacuum brazing operation has been proposed in which a substantially complete degassing treatment can be carried out by subjecting the peripheral wall surfaces of said internal and external shells to a heating treatment and evacuating a jacket between said two shells. Furthermore, production is designed to be simplified. Said process comprises the steps of transferring the assembly of a metal vacuum bottle to a vacuum heating furnace for heating and evacuating gases from said assembly which is previously set with a filler metal at the seamed portion between the internal and the external shells, and of brazing said seamed portion by heating at a temperature higher than the melting point of the filler metal under the desired degree of vacuum, for instance, lower than $10^{-2}$ Torr. According to the above-mentioned process, the assembly is subjected to vacuum baking when the internal and the external shells of a vacuum bottle are brazed together, so that the degassing treatment for said peripheral surfaces is effected at the same time, thereby favorably avoiding deterioration of the vacuum thermal insulation effect in the course of aging. In a conventional process, two steps have generally been necessary for producing a vacuum bottle, one of which is brazing the internal and the external shells together and the other step being evacuation of space between said two shells. In the foregoing proposed process, however, the aforesaid steps can advantageously be carried out concurrently. Unfortunately, many troubles and inconveniences have occurred in putting said proposed process to a practical use. For instance, it is imperative to obtain a sufficiently high degree of vacuum because of the faculty of a vacuum bottle being dependent upon the thermal insulation effect. It is desirable to provide said high degree of vacuum with all possible haste. However, when the vacuum brazing operation is applied to the process, the difference between the vacuum furnace and the thermal insulation layer portion of a vacuum bottle in view of the vacuum degree is brought forth due to influence of conductance, so that the evacuation should be carried on for a long period of time in order to acquire a desired vacuum degree. Said troubles are caused by the fact that it is not desirable to enlarge the sectional area of the vacuum suction port formed on the thermal insulation layer portion. (Said suction port is heated to be sealed by a filler metal at the melting temperature thereof). On the other hand, if the vacuum suction port is enlarged in anticipation of the evacuation effect, the operation for sealing with a brazing filler metal becomes complicated and may cause an unreliable sealing. Furthermore, in many cases the desired level of the vacuum after subjecting the vacuum suction port to the vacuum brazing operation may not be maintained owing to residual gas within the thermal insulation layer portion, said gas having been generated at the time of the brazing filler metal being melted. Still further, in the vacuum brazing operation for producing a vacuum bottle, the whole body of said vacuum bottle has to be heated at a high temperature so that, in case of producing a vacuum bottle with austenite stainless steel or the like, it should be influenced by the annealing effect which causes a problem in that the external shell will have to be of substantial thickness. An increase in weight results as well as a considerable rise in the cost of production, etc.

SUMMARY OF THE INVENTION

The present invention eliminate the foregoing drawbacks in conventional processes, and also provides a process which is able to be put to practical use by utilizing the absorption of a getter during the brazing operation so as to provide a one step process for producing a metal vacuum bottle.

The present invention will now be explained in detail with reference to the drawings by way of example of an embodiment of the invention.

DESCRIPTION OF THE PREFERRED EMBODIMENTS

Figure 1:
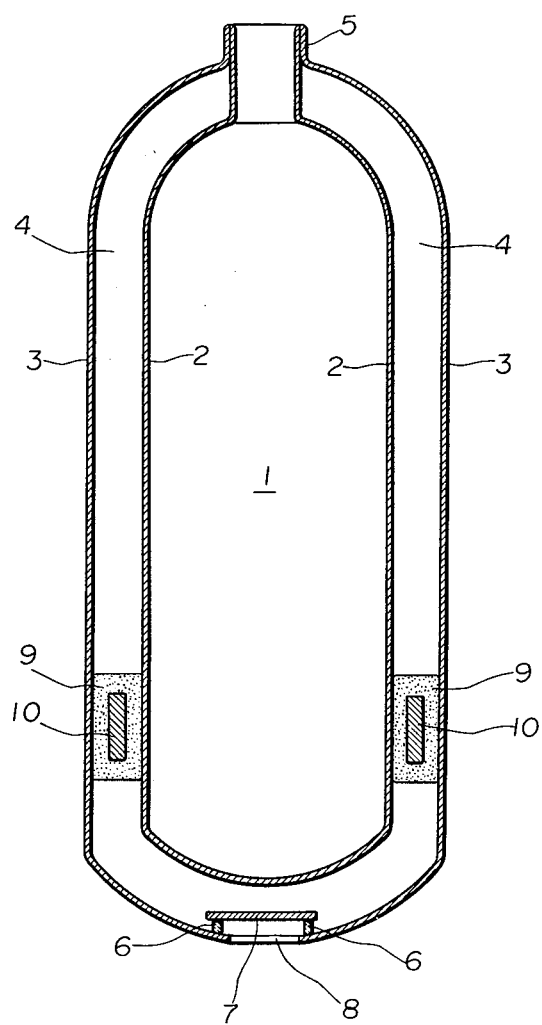
FIG. 1 is a longitudinal sectional view of a vacuum bottle made of a metal according to the present invention showing the internal structure thereof in a form of an embodiment of the invention.

In FIG. 1, the reference numeral 1 designates a vacuum bottle (made of a metal) comprising an internal shell 2 and an external shell 3. A vacuum thermal insulation layer portion 4 is provided between said shells 2 and 3. Numeral 5 denotes a seamed portion formed between the internal and the external shells 2 and 3 set by a filler metal such as a nickel alloy and others. 6 indicates a filler metal such as a nickel alloy which is identical in quality with the one set at the seamed portion 5 mentioned above, 7 is a sealing plate made of metal having the same quality as the vacuum bottle 1 for sealing a vacuum suction port 8. Said sealing plate 7 is mounted on said filler metals 6 set to be opposed to each other at an appropriate clearance. Accordingly, said filler metal 6 connects said sealing plate 7 with the inner peripheral wall of the external shell 3 as well as forming a part of a vent serving as a supporting member which provides an appropriate ventilation flue between said vacuum thermal insulation layer portion 4 and the outer air. Still further, the reference numeral 9 represents a thermal insulation material, for instance, aluminum silicate, in a shape of cotton. 10 designates powdery metallic getter such as titanium hydride or the like interposed within said thermal insulation material 9. The getter is adapted to discharge gas at a high temperature and then, at a certain constant temperature, to absorb gases, particularly hydrogen.

The assembly of the vacuum bottle made in the form as mentioned above is put in a vacuum furnace to be evacuated. Said evacuation treatment is conducted in vacuum brazing the seamed portion 5 to be formed between the internal and the external shells 2 and 3. However, since along with exhaustion of gas within the vacuum furnace, the other gases existing in the vacuum thermal insulation layer portion 4 and gases ejected from the getter substance are discharged into said vacuum furnace from the vacuum suction port 8 through the clearance formed between said filler metal 6 and the sealing plate 7, said evacuation treatment within the vacuum thermal insulation layer portion 4 is concurrently advanced. Due to the above-mentioned evacuation treatment, the vacuum within the furnace as well as within the vacuum thermal insulation layer portion 4 becomes increasingly higher, and when the degree of vacuum reaches a predetermined level, heating treatment starts. Said heating treatment is carried on until the internal temperature of the vacuum furnace becomes uniform at a temperature somewhat lower than the melting point of a said filler metal. Thus a predetermined degree of vacuum, for instance $10^{-2}$ Torr, is obtained. However, in the course of said heating treatment, said getter substance such as titanium hydride and the like is adapted to eject absorbed gases to be activated. In the next step, the internal temperature of said vacuum furnace is raised up higher than the temperature of said filler metal's liquid melting point to melt the filler metal set at the seamed portion 5 formed between the internal and the external shells 2 and 3 for joining two shells. At the same time, the filler metal 6 which has been functioning as a supporter is also fused, so that the sealing plate 7 which has lost the supporter should fall downward onto the inner peripheral wall of the external shell 3 and is brazed by said molten filler metal to seal the vacuum suction port 8. After completion of evacuation of the space between the two shells as well as the brazing of the internal and external shells together by the foregoing steps, said assembly is subjected to cooling at temperature at which said getter 10 is able to act most effectively. Then all of residual gases within said insulation layer 4 as well as gases ejected from said molten filler metal when said seamed portion 5 and vacuum suction port 8 were sealed are absorbed by the getter substance 10 with said lowered temperature being maintained for a certain constant period of time. Subsequently, the degree of vacuum in the thermal insulation layer portion 4 is increased after which said assembly thus cooled is cooled down to room temperature.

The present inventors have attempted to produce a metal vacuum bottle made of SUS 304 as a trail product, employing the Ni alloy as a filler metal and the getter in a form of a powdery titanium hydride enveloped by an thermal insulation material of alumina silicate system in a form of a cotton. When the degree of vacuum within a vacuum furnace reaches $10^{-2}$ Torr during vacuum heating, the temperature within the furnace is raised up to about 1050° C. to melt the filler metal 6, thereby sealing the vacuum suction port 8. Subsequently, the furnace temperature is lowered down to about 600° C., then the bottle is kept under said temperature for approximately 10 minutes and is cooled to a room temperature. A metal vacuum bottle can thereby be produced which provides excellent thermal insulation as compared with vacuum bottles produced by conventional manufacturing processes.

Figure 2:
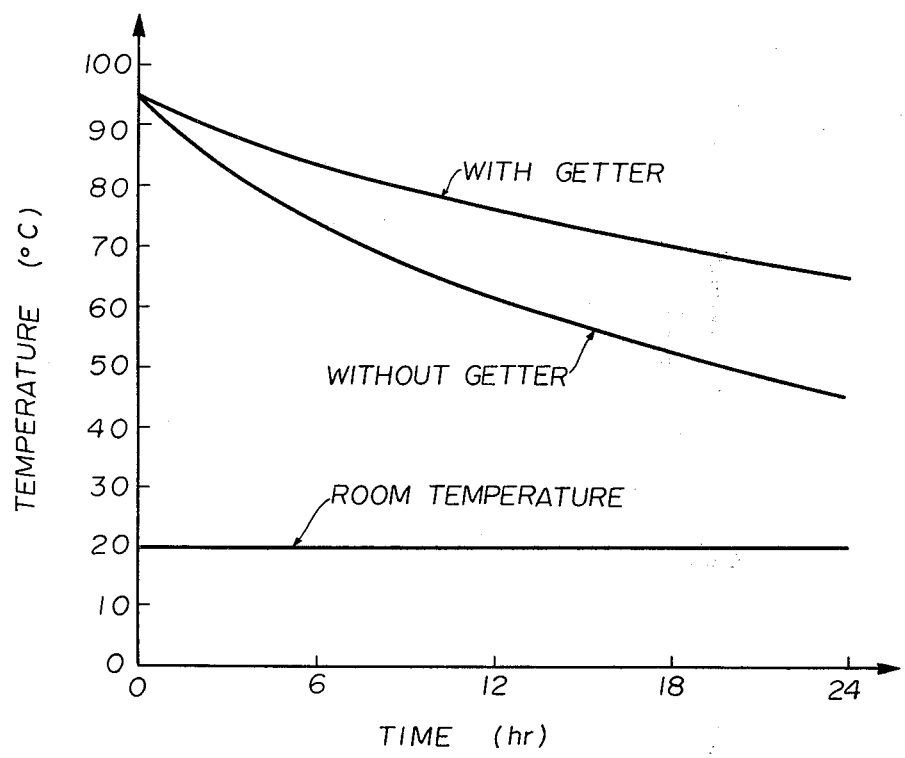
FIG. 2 is a graph showing the comparison between vacuum bottles produced by the present inventive process and the one by a conventional process on the temperature change of boiled water filled in both of said vacuum bottles caused by time elapsed.

FIG. 2 is a graph showing the comparison between a vacuum bottle manufactured by a conventional process and a bottle produced by the present inventive process. The temperature change of boiling water over a period of time is illustrated. In this instance, the vacuum bottle made by a conventional process is subjected to sufficient evacuation treatment until the degree of vacuum within the vacuum furnace reaches $10^{-4}$ Torr, while the present inventive vacuum bottle is sealed when the degree of vacuum reaches $10^{-2}$ Torr. However, the thermal insulation property of the present inventive vacuum bottle is proved to be far superior to that of said vacuum bottle made by the conventional process.

Figure 3:
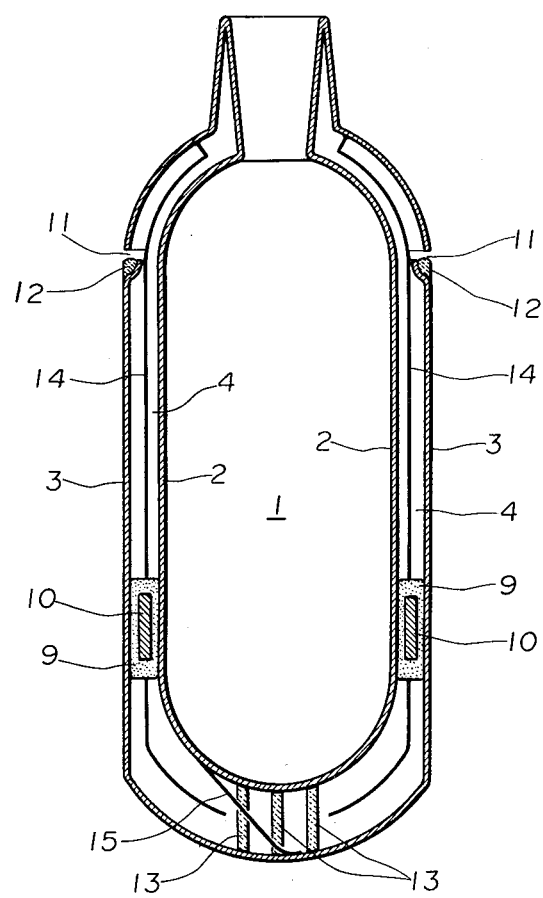
FIG. 3 is a longitudinal sectional view of a vacuum bottle made of a metal according to the present invention showing the internal structure thereof in a form of a modification of the invention.

FIG. 3 shows a modified embodiment of the present invention. The vacuum suction port is constructed at the seamed portion 11 formed between the internal and the external shells 2 and 3. Supporting members 13, made of a filler metal which is the same quality to the filler metal 12 set at the seamed portion 11, are interposed between the internal and external shells 2 and 3 at their bottom parts. The internal shell 2 is supported so as to form a clearance at said seamed portion 11. Such an assembly of a vacuum bottle as mentioned above is subjected to treatment within a vacuum furnace in a similar manner as described hereinbefore. However, evacuation of the vacuum thermal insulation layer portion 4 is effected through the clearance formed at said seamed portions 11. When heat is applied to raise the temperature higher than the melting point of the filler metal 12, said filler metal 12 is melted as well as said supporting member 13 so that the internal shell 2 falls downward to be brazed to the external shell 3. Subsequently, due to maintaining the furnace temperature at an activating temperature of the getter 10 for a certain period of time, a vacuum bottle having excellent thermal insulation properties (similar to that of the one explained in the first embodiment) can be produced. Further, the reference numeral 14 represents a shielding plate which is previously subjected to spot welding connected with the external shell 3. Numeral 15 designates a supporter made of fine metal wire connected at one end with the outer periphery of the internal shell 2, while the other free end of said supporter is kept in touch with the inner periphery of the external shell 3 as well as keeping in touch with the supporting member 13, so that the free end of said supporter 15 is adapted to be securely adhered to the inner periphery of the external shell 3 due to melting of said supporting member 13 so as to hold the internal shell 2 when the internal and the external shells 2 and 3 are securely connected with each other.

A vacuum bottle made of metal is generally most desirably produced with such a base metal as aluminum and the like having excellent workability. However, because they have a high heat conductivity, stainless steel having a low heat conductivity is commonly used as a base metal. Accordingly, in manufacturing a vacuum bottle by a vacuum brazing process as set forth hereinbefore it is necessary to make the external shell of considerable thickness since annealing effect occurs during vacuum brazing to weaken the mechanical strength of a stainless steel.

However, the process for producing a vacuum bottle according to the present invention is favorably capable of avoiding drawbacks following the annealing effect by carrying out said vacuum heating treatment after spraying the getter over the outer and the inner peripheral surfaces of the internal and the external shell at their thermal insulation layer portions 4, respectively. In other words, the vacuum heating treatment is carried out after powdery metallic getter has been sprayed or coated on said peripheral surfaces or other desired portions. The getter is thereby diffused into said peripheral surfaces to form an intermetallic compound which enhances the hardness of the base metal of the vacuum bottle. Accordingly, the thermal insulation property of said parent metal is improved by an effect of said getter as well as the strength of the vacuum bottle being increased.

Further, as for the getter employed in the present inventive process, such metals as titanium, zirconium and the like are utilized. Still other alloys, hydrides of said metals or mixtures of each of the above enumerated metals can be also utilized. The invention is not, however, particularly limited to them, but any other kinds of metals which are capable of effectively absorbing hydrogen in the course of manufacturing steps according to the present inventive process can be used. In other words, such kinds of metals may be applicable to the getter as those which are able to absorb hydrogen at a temperature not higher than the melting point of the filler metal as well as under a desired vacuum degree. Moreover, in the above-mentioned embodiments, the explanation was given on a vacuum bottle having a structure provided with the vacuum suction port of the thermal insulation layer portion formed on the bottom part of the external shell or on the seamed portion of the internal and the external shell. However, any other structures which are provided with clearance formed on the bottom part of the internal shell or on the top opening of the internal and the external shells for effecting evacuation may substitute for the above-mentioned embodiments.

As will clearly be understood from the foregoing description, the present invention has the advantage of simplifying the process of producing a vacuum bottle made of metal by performing the seam treatment between the internal and the external shells simultaneously, with the evacuation of the vacuum thermal insulation layer portion due to a vacuum brazing operation. Moreover, an improved device which is superior to those manufactured by conventional processes is obtained with the aid of the absorbing faculty of the getter at the step of vacuum brazing treatment. For example, deterioration in the degree of vacuum at the vacuum thermal insulation layer portion caused by inevitably generating gases in the step of the brazing treatment can be prevented. Thereby a vacuum bottle having excellent thermal insulation properties can be obtained. Moreover, since the degree of vacuum at the vacuum thermal insulation layer portion during evacuation with a vacuum heating by a vacuum furnace does not need to be raised up more than that of a conventional vacuum bottle produced by prior art methods, the time necessary for evacuation treatment can be shortened. Thus the cost of production can be lowered. Still further, as the working steps for the vacuum suction port are able to be simplified, product defects can be minimized. In addition to the foregoing effect, the strength of the base material of the vacuum bottle can be increased by spraying or coating the getter over the wall surface of said thermal insulation layer portion as occasion demands, so that a product having light weight can be obtained.

I claim:

1. A process for producing a metal vacuum bottle composed of internal and external shells respectively made of metal in which a seam between said two shells is formed simultaneously with an evacuation between said two shells by a vacuum brazing operation, said process characterized in comprising a step of brazing an assembly of the vacuum bottle at said seamed portion thereof through a vacuum heating treatment, said assembly being formed in a predetermined shape and constructed by assembling the internal and the external shells together and accommodating a getter to be sealed between said two shells, and a step of enhancing the vacuum degree between said internal and the external shells by maintaining a temperature for a certain period of time at which said getter becomes active.

2. A process according to claim 1 which is further characterized in that said brazing operation through the foregoing vacuum heating treatment is carried out at a temperature higher than 750° C.

3. A process according to claim 1 which is further characterized in that said getter belongs to such a metal, an alloy or a compound, any of which absorbs hydrogen under the conditions of the vacuum degree being less than $10^{-2}$ Torr and the temperature being lower than 750° C.

4. A process for producing a metal vacuum bottle composed of internal and external shells respectively made of metal in which the seam between said two shells is formed simultaneously with the evacuation between said two shells by a vacuum brazing operation, said process characterized in comprising a step of brazing an assembly of the vacuum bottle at the seamed portion thereof through a vacuum heating treatment, said assembly being formed in a predetermined shape and constructed by assembling the internal and the external shells together, and peripheral wall surfaces between the internal and the external shells being sprayed or coated with a getter, and a step of enhancing the vacuum degree between said internal and the external shells by maintaining a temperature for a certain period of time at which said getter becomes active as well as of increasing the strength of a base material with the help of said getter diffusing over said peripheral surfaces on which said getter having been sprayed or coated in the aforesaid vacuum heating treatment.

5. A process according to claim 4 which is further characterized in that the brazing operation through the aforementioned vacuum heating treatment is carried out at a temperature higher than 750° C.

6. A process according to claim 4 which is further characterized in that said getter belongs to such a metal, an alloy or a compound, any of which absorbs hydrogen under the condition of the vacuum degree being less than $10^{-2}$ Torr and the temperature being lower than 750° C.

* * * * *